United States Patent [19]

Darrow

[11] 4,314,237
[45] Feb. 2, 1982

[54] FAIL-SAFE ACKNOWLEDGING CIRCUIT

[75] Inventor: John O. G. Darrow, Murrysville, Pa.

[73] Assignee: American Standard Inc., Swissvale, Pa.

[21] Appl. No.: 153,493

[22] Filed: May 27, 1980

[51] Int. Cl.³ .................. B61L 15/00; B61L 3/00; G08B 23/00

[52] U.S. Cl. .................. 340/502; 340/47; 340/52 D; 340/507; 180/170; 180/171; 364/426; 246/5; 246/182 R; 246/187 R

[58] Field of Search .......... 340/502, 500, 501, 506, 340/507, 519, 43, 47, 48, 52 F, 53, 62, 52 D; 180/170, 171; 364/426; 246/5, 182 R, 182 A, 182 B, 182 C, 186, 187 R, 187 A, 187 B

[56] References Cited
U.S. PATENT DOCUMENTS 3,696,356 10/1972 Franke et al. .................. 340/502
4,177,459 12/1979 Darrow ....................... 340/502

*Primary Examiner*—Thomas A. Robinson
*Assistant Examiner*—Donnie L. Crosland

*Attorney, Agent, or Firm*—J. B. Sotak

[57] ABSTRACT

A fail-safe acknowledging circuit having a plurality of relay switching contacts having a predetermined order of more restrictive significance. A differentiating circuit selectively interconnected by certain ones of the plurality of relay switching contacts for establishing a selected one of a plurality of charging potential levels from a d.c. voltage source. A latching circuit is conditioned by a holding voltage and is set by momentarily closure of an acknowledging switch to produce a.c. signals which are fed to one input of a two-input AND gate. A checking circuit monitors the voltage level of the d.c. voltage source and verifies the integrity of the differentiating circuit to produce a d.c. potential which is conveyed to the other input of the two-input AND gate. The output of the two-input AND gate supplied to a time delay circuit for normally energizing a brake release relay and for deenergizing the brake release relay if the acknowledging switch is not momentarily reclosed within a given period of time after the reception of a more restrictive speed command signal.

13 Claims, 1 Drawing Figure

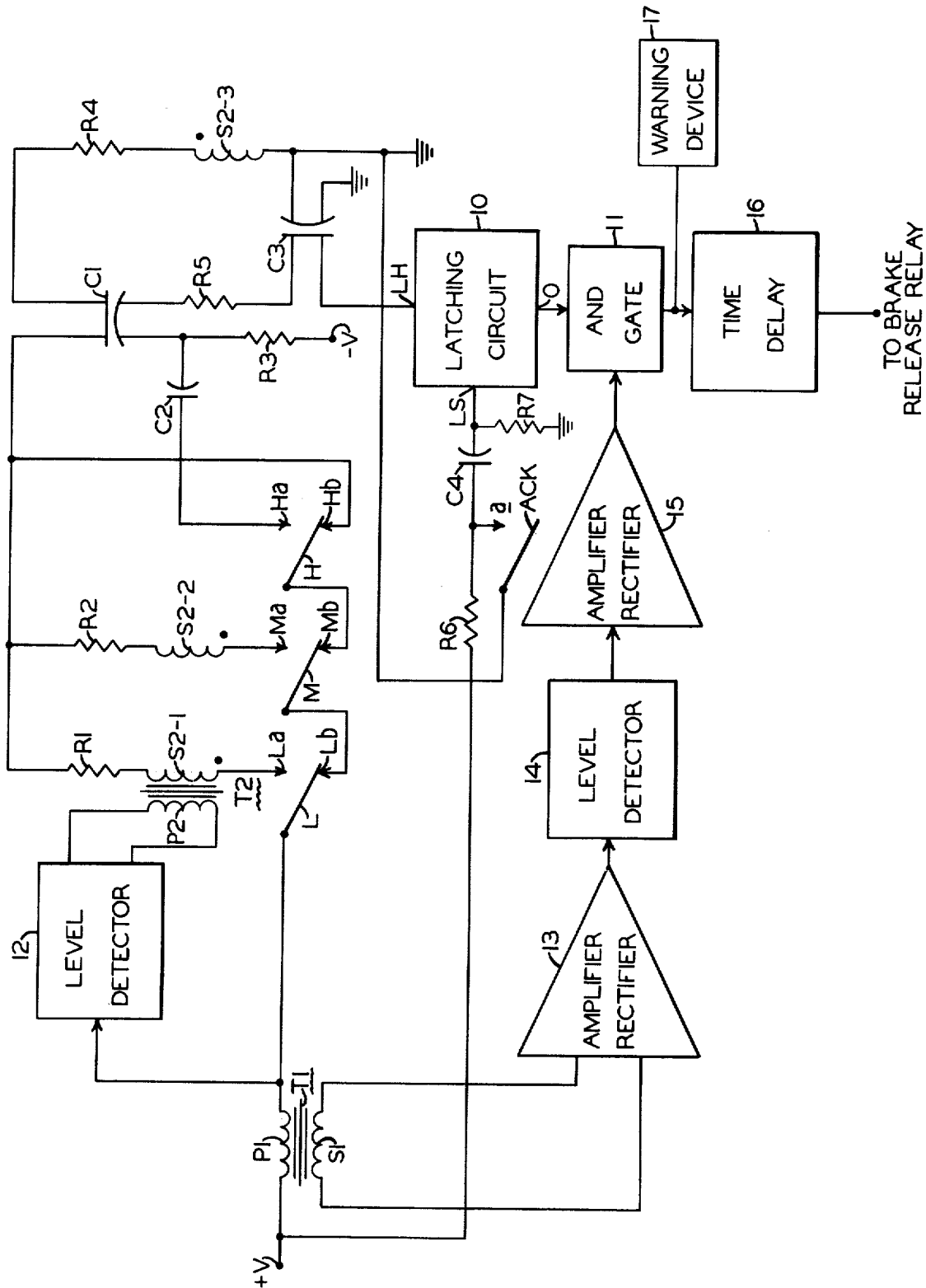

4,314,237

FAIL-SAFE ACKNOWLEDGING CIRCUIT

FIELD OF THE INVENTION

This invention relates to a vital electronic acknowledging circuit and more particularly to an improved fail-safe solid-state circuit arrangement which requires an acknowledgment of an operator within a given period of time after the reception of a more restrictive speed command signal in order to prevent the automatic initiation of the emergency braking operation of a moving railway vehicle.

BACKGROUND OF THE INVENTION

In railway cab signaling and speed control systems, various vehicle-carried apparatus and circuits are employed for being selectively responsive to one of a plurality of speed command input signals. The speed command signals are picked up from the wayside by inductive coils located ahead of the front axle of the leading vehicle. Each of the signals are coded to indicate the authorized speed that the train or transit vehicle is permitted to travel in any given section or block of trackway as it proceeds along the route of travel. The picked-up signals, which are made up of a carrier frequency signal and a selected one of a plurality of code frequencies or rates, after amplification and demodulation, are applied to a code-following master relay. This relay, in turn, drives the code filters which are selectively responsive to the particular code rate. The code responsive filters are connected to decoding relays to provide a given cab signal indication to the trainman or operator in the cab of the locomotive or lead vehicle. It will be appreciated that in such cab signal speed control systems, it is an authorative requirement for the trainman or operator to take appropriate action within a given period of time after the reception of a more restrictive speed command. Thus, when a more restrictive or lower speed command signal is received on board the vehicle, the operator must immediately acknowledge a warning signal and begin decelerating the moving train to the newly prescribed speed or the emergency brakes will be automatically applied after an elapsed period of time to bring the train to a complete stop. In practice, the acknowledgment of the warning signal and the deceleration of the moving train or transit vehicle must take place as soon as possible after the reception of the more restrictive speed command in order to prevent the train or vehicle from going too fast and too far beyond a safe braking and stopping point. Additionally, in order to provide the highest degree of safety to individuals and to afford the greatest protection against damage to the equipment, it is essential to ensure that under no circumstance will a critical component or circuit failure be capable of producing an unsafe condition. In the past, electronic acknowledging circuits were relatively expensive to initially purchase due to the excessive number of components and were costly to subsequently maintain due to the complexity of the circuitry. Thus, it is highly advantageous to develop a failsafe electronic acknowledging circuit which is simple in design and inexpensive to purchase and maintain.

OBJECTS OF THE INVENTION

Accordingly, it is an object of this invention to provide a new and improved fail-safe electronic acknowledging circuit.

A further object of this invention is to provide a novel fail-safe acknowledging circuit arrangement which requires the initiation of an acknowledgment within a given period of time after the reception of a more restrictive command signal.

Another object of this invention is to provide a vital type of electronic acknowledging circuit which utilizes a differentiating circuit, a latching circuit, an AND gate, a checking circuit and a time delay for requiring an acknowledging procedure after introduction of a more restrictive signal.

Yet another object of this invention is to provide a unique fail-safe circuit arrangement which deactivates an output if an acknowledgment is not initiated within a given period of time after reception of a more restrictive signal.

Still another object of this invention is to provide a fail-safe acknowledging circuit for requiring the acknowledgment of the receipt of a more restrictive signal comprising, a plurality of signal command switches having a predetermined order of more restrictive significance, a differentiating circuit selectively interconnectable by at least one of the plurality of signal command switches for selectively establishing a selected one of a plurality of charging levels dependent upon the electrical condition of the plurality of signal command switches, a latching circuit having a hold input connectable to the differentiating circuit and having a set input connectable to an acknowledging means, the latching circuit having an output, an AND circuit having one of two inputs connected to the output of the latching circuit, a checking circuit connected to the other of the two inputs for verifying the absence of an unsafe condition, and the AND circuit producing an output signal when the latching circuit provides a signal to the one of the two inputs and the checking circuit provides a signal to the other of the two inputs.

SUMMARY OF THE INVENTION

In accordance with the present invention, there is provided a vital type of electronic acknowledging circuit which requires an acknowledgment within a prescribed period of time after the reception of a more restrictive speed command. The electronic acknowledging circuit includes a low, a medium, and a high speed command relay, each having a front, a back, and a heel contact for selectively establishing one of a plurality of differentiating circuits from a d.c. voltage source to a differentiating capacitor for setting one of a plurality of potential levels. A latching circuit conditioned by a negative holding voltage and activated by an acknowledging switch which provides a negative set voltage to the latching circuit for producing a.c. output signals. The a.c. output signals are applied to one input of a two-input AND gate circuit. A checking circuit includes a first level detecting circuit for monitoring the potential level of the d.c. voltage source and for injecting an a.c. voltage into the selected differentiating circuit. The a.c. voltage causes a current to flow through the selected differentiating circuit which is transformer coupled to the input of a first amplifier-rectifier. The output of the first amplifier-rectifier is applied to a second level detecting circuit which verifies the vitality of the selected differentiating circuit by producing a.c. voltage signals. The a.c. voltage signals are applied to a second amplifier-rectifier which supplies a d.c. voltage to the other input of the two-input AND gate circuit. The presence of the a.c. signals and d.c. voltage on the two inputs of the AND gate circuit results in an input to a time delay circuit to maintain the energization of a load. The reception of a more restrictive speed command results in an upward change of the potential level on the differentiating capacitor due to the transfer of the heel contacts between the front and back contacts of the low, medium, or high speed command relays. The upward change of the potential is differentiated by the differentiating capacitor to produce a positive pulse which momentarily negates the negative holding voltage and results in the elimination of the a.c. output signals. If the latching circuit is not reset by actuation of the acknowledging switch within the prescribed period of time, the time delay circuit deenergizes the load.

BRIEF DESCRIPTION OF THE DRAWING

Other objects, features, and advantages of this invention will become more clearly and readily understood from the following detailed description when considered in conjunction with the accompanying drawing wherein:

The single FIGURE is a schematic circuit diagram of a vital electronic acknowledging circuit arrangement in accordance with the present invention.

Referring now to the single FIGURE of the drawing, there is shown a fail-safe or vital electronic circuit arrangement for acknowledging a more restrictive speed signal in accordance with the subject invention. For the purpose of convenience, it will be observed that the present invention will be described in relation to three (3) speed command cab signal systems; however, it is understood that the number of speed command signals may be increased or decreased in practicing the subject invention dependent upon the required number of speed commands of the particular cab signal system. As shown, the input signals are conveyed to a plurality of speed command relays, such as, a low, a medium, and a high speed command relay which controls the movable switches or heel contacts L, M and H, respectively. The movable switch or contact H, which represents the high speed command signal, is the least restrictive, the movable switch or contact M, which represents the medium speed command signal, is the second least restrictive, while the movable switch or contact L, which represents the low speed command signal, is the third least restrictive. Further, the absence of all the input signals which represent a zero speed command, is the most restrictive condition. It will be noted that the movable relay contacts L, M and H include stationary front and back contacts or switch points La and Lb, Ma and Mb, and Ha and Hb, respectively.

As shown, the movable heel contact L is connected to a positive voltage terminal +V of a suitable source of supply potential (not shown) via a primary winding P1 of transformer T1, the purpose of which will be described in greater detail hereinafter. The back contact Lb is directly connected to the heel contact M while the back contact Mb is directly connected to the heel contact H. The back contact Hb is directly connected to one terminal of the upper plate of a four-terminal differentiating capacitor C1. It will be noted that the front contact La is connected to the one terminal of the upper plate of differentiating capacitor C1 via resistor R1 and secondary winding S2-1 of transformer T2, the purpose of which will be described in greater detail hereinafter. The front contact Ma is connected to the one terminal of the upper plate of differentiating capacitor C1 via resistor R2 and secondary winding S2-2 while the front contact Ha is connected to one terminal of the lower plate of differentiating capacitor C1 via coupling capacitor C2. The one terminal of the lower plate of differentiating capacitor C1 is also connected to a negative voltage terminal −V via resistor R3. The other terminal of the upper plate of differentiating capacitor C1 is connected through resistor R4 and series connected secondary winding S2-3 to a reference point or ground. The other terminal of the lower plate of differentiating capacitor C1 is connected by a resistor R5 to one terminal of the left-hand plate of a four-terminal capacitor C3. The one terminal of the right-hand plate of the capacitor is connected to ground which is common to the lower end of secondary winding S2-3, while the other terminal of the right-hand plate of capacitor C3 is also connected to what is preferably a separate ground connection. As shown, the other terminal of the left-hand plate of capacitor C3 is connected to one of the two inputs of a latching circuit 10.

In practice, the latching circuit may be of the type similar to that shown and disclosed in my U.S. Pat. No. 4,177,459, entitled Fail-Safe Acknowledging Circuit. As shown, the latching circuit 10 includes a Hold input LH as well as a set input LS. It will be seen that a negative input voltage is supplied to the Hold input LH of the latching circuit 10. That is, the negative terminal −V is connected through resistor R3, over the one and other terminals of the lower plate of the capacitor C1, through resistor R5, and over the one and other terminals of the left-hand plate of the capacitor C3 to the Hold input LH. It will be noted that the set input LS is connected to the positive supply voltage terminal +V via the series connected capacitor C4 and resistor R6. A resistor R7 is connected between input LS and ground. The junction point between the series connected capacitor C4 and resistor R6 is connected to the stationary contact a of an acknowledgment switching means including a movable heel contact ACK which is connected to ground. As shown, the a.c. output terminal O of the latching circuit 10 is connected to one input of a two-input AND gate circuit 11. The AND gate 11 may be of the type similar to that shown and described in U.S. Pat. No. 3,430,066 which is a fail-safe logic circuit for producing an output when and only when both inputs are present and no critical component or circuit failure exists.

In order to verify circuit integrity and to ascertain fail-safe operation, it is necessary to employ a checking circuit for monitoring the condition of the various portions of the charging circuit. In practice, the amplitude of the d.c. voltage on terminal +V must be checked against any decrease which could reduce the level of the turn-off pulse on the Hold input of the latching circuit 10. This is accomplished by employing a level detector 12. As shown, the positive voltage terminal +V is connected to the input of level detector 12 via the primary winding P1 of transformer T1. The level detector 12 may be of the type shown and disclosed in my U.S. Pat. No. 3,737,806 which is a fail-safe electronic circuit for producing an a.c. output signal when and only when the amplitude of the d.c. input voltage exceeds a predetermined value. Thus, when the positive d.c. voltage is above the predetermined value, a.c. output signals are developed in the primary winding P2 of transformer T2. As will be described hereinafter, the a.c. signals produced by level detector 12 are conveyed via transformer T2, through one or more of the relay contacts to the transformer T1 which includes a secondary winding S1. As shown, the secondary winding S1 is connected to the input of a suitable amplifier-rectifier 13 wherein the amplified a.c. signals are rectified to supply d.c. voltage to fail-safe level detector 14. The level detector 14 may also be of the type shown and disclosed in U.S. Pat. No. 3,737,806. The a.c. signals derived from the output of level detector 14 are fed to the input of a suitable amplifier-rectifier 15 which may be similar to amplifier-rectifier 13. Thus, the amplified a.c. signals are rectified to provide a d.c. input voltage to the other input of the AND gate 11.

Turning now to the operation, let us assume that the circuit is intact and functioning properly, that the positive voltage appearing on terminal +V exceeds the predetermined value, and that the switches L, H, M, and ACK are in the positions shown in the drawing. Under this condition, it will be seen that the full potential on the positive terminal +V is applied to the upper plate of differentiating capacitor C1 since it may be assumed that the transformer windings have zero or relatively low d.c. resistances. Thus, the positive d.c. voltage is conveyed from terminal +V, through primary winding P1, over heel and back contacts L-Lb, M-Mb, and H-Hb, to the upper plate of capacitor C1 and through resistor R4 and secondary winding S2-3 to ground. Ergo, the potential level on the upper plate of the capacitor C1 is substantially equal to the d.c. voltage +V. Further, it will be seen that a negative holding voltage is applied from terminal −V to the Hold input LH of latching circuit 10 via resistor R3, lower plate of the four-terminal capacitor C1, resistor R5 and left-hand plate of the four-terminal capacitor C3 to input LH. The capacitor C4 is charged such that its left plate is more positive than its right plate. Now, if the acknowledging switch ACK is momentarily closed so that contact a is connected to ground, a negative set pulse is developed on input LS via capacitor C4 so that the latching circuit delivers an a.c. signal to the one input of the AND gate 11. It will be appreciated that the arrangement of resistor R6, capacitor C4, and that acknowledging switch ACK insures that the continuous holding of the switch will not produce a continuous set signal at input LS, which would be an unsafe condition.

As previously mentioned, verification of the safe operation of the circuit is accomplished by utilizing the checking circuit for monitoring the existing condition. Since the d.c. voltage of terminal +V is above the predetermined level, the level detector 12 is functional and produces a.c. signals which are conveyed to primary winding P2. The a.c. signals in primary winding P2 are transformer coupled to secondary winding S2-3. The a.c. voltage signals induced into the secondary winding S2-3 cause an a.c. current to flow through resistor R4, over the upper plate of capacitor C1, over the back and heel contacts Hb-H, Mb-H, and Lb-L and through the primary winding P1 of transformer T1. The a.c. current flowing through the primary winding causes a.c. signals to be induced into the secondary winding S1 which are amplified and rectified by amplifier-rectifier 13. Next, the rectified voltage is level detected by circuit 14, which results in the production of a.c. output signals whenever the rectified voltage exceeds threshold breakdown of a zener diode of detector 14. Thus, the level detector produces a.c. signals which are amplified and rectified by amplifier-rectifier circuit 15 to supply a d.c. voltage to the other input of the two-input AND gate 11. Accordingly, the presence of both the a.c. and d.c. inputs causes an a.c. output to be produced by the AND gate 11 which is fed to a suitable time delay circuit 16. The circuit 16 normally energizes a brake release relay when the a.c. input is fed thereto and will hold the brake release relay picked up for approximately five (5) seconds after the a.c. signals are removed from its input. Thus, the acknowledging circuit is activated and the brake release relay will be energized so long as a more restrictive signal is not received on-board the railway vehicle and no critical or component failure occurs.

Let us now assume that a low speed command signal is received on board so that the low speed relay is energized thereby causing the opening of the back contact Lb and the closing of the front contact La by the heel contact L. Under this condition, the primary winding P2 induces a.c. voltage signals not only in secondary winding S2-3 but also in secondary winding S2-1. Further, it will be seen that the charging circuit now extends from the positive voltage terminal +V through primary winding P1, through secondary winding S2-1, through resistor R1, to the upper plate of capacitor C1. However, the introduction of the resistance of resistor R1 results in a given amount of voltage drop. In practice, the value of the resistor R1 has been chosen to cause a voltage drop of substantially one-third the value of the d.c. voltage on terminal +V so that the potential on the upper plate of capacitor C1 is two-thirds of the value of the d.c. voltage +V. It will be appreciated that the negative voltage change is differentiated by capacitor C1 to produce a negative voltage pulse which is conveyed to the Hold input LH of the latching circuit 10. However, the negative going pulse does not materially effect the condition of the latching circuit 11 since it is already conditioned by the negative voltage from d.c. source −V. The integrity of the charging circuit is now checked over an a.c. circuit path extending from winding S2-3, through resistor R4, over the upper plate of capacitor C1, through resistor R1, through secondary winding S2-1, over front and heel contacts La-L, through primary winding P1 to the positive voltage terminal +V. In order to keep the a.c. input signal to the amplifier 13 constant, a calculated amount of a.c. voltage is added by the series aiding secondary winding S2-1 to compensate for the voltage drop of resistor R1. Thus, the amplifier-rectifier continues to supply a d.c. input voltage to the one input of AND gate 11 so that a.c. output signals continue to be produced and to be delivered to the input of time delay circuit 16 so that the load, namely, the brake release relay continues to be energized.

Let us now assume that a medium speed command signal is received on board the vehicle so that the medium speed relay becomes energized while the slow speed relay is deenergized. Under this condition, the charging circuit now extends from the positive d.c. voltage terminal +V, through primary winding P1, over heel and back contacts L-Lb, over heel and front contacts M-Mb, through secondary winding S2-2, through resistor R2 to the upper plate of capacitor C1 and through resistor R4 and secondary winding S2-3. In practice, the value of resistor R2 has been chosen to cause a voltage drop of approximately two-thirds the value of the positive d.c. voltage +V. Thus, the potential charge on the capacitor suddenly drops from $\frac{2}{3}$ +V to $\frac{1}{3}$ +V. This negative voltage drop again is differentiated by capacitor C1 but the negatively produced pulse has no effect on the negative Hold input LH of the latching circuit 10. It will be seen that the vitality of the charging circuit is now checked through an a.c. circuit path extending from secondary winding S2-3, through resistor R4, over the upper plate of capacitor C1, through resistor R2, through secondary winding S2-2, over front and heel contacts Ma-M, over back and heel contacts Lb-L, through primary winding P1 to the positive d.c. voltage terminal +V. In practice, the a.c. voltage induced in secondary winding S2-2 offsets the a.c. voltage drop across resistor R2 so that the induced voltage applied to the input of the amplifier-rectifier 13 remains constant. Thus, AND gate 1 continues to produce a.c. output signals which are fed to time delay circuit 16 to hold the brake release relay energized.

Now if a high speed command signal is received on board the vehicle, the high speed signal relay becomes energized, and the medium speed signal relay becomes deenergized while the low speed signal relay remains deenergized. Thus, it will be seen that there is no longer any charging circuit path for capacitor C1 so that the potential level on the upper plate goes to zero. Again, the negative transition is differentiated by capacitor C1 but the negative pulse has no effect on the Hold input LH. The vitality of the circuit is checked by an a.c. circuit path which extends from secondary winding S2-3, through resistor R4, capacitor C1 and coupling capacitor C2 over front and heel contacts Ha-H, over back and heel contacts Mb-M and Lb-L, through primary winding P1 to the positive voltage terminal +V. Thus, the transformer coupled voltage to the input of the amplifier-rectifier 13 remains substantially constant so that an a.c. output voltage continues to be supplied to the time delay circuit 16 for energizing the brake release relay.

Let us now assume that the vehicle is proceeding along its route of travel and that a more restrictive speed command signal, such as, a medium, low or zero speed, is received on board the vehicle. Under this condition, the trainman or operator is required to initiate a deceleration or braking action within a given time after the reception of a more restrictive speed command. Assuming a medium speed command is received so that the medium speed signal relay becomes energized, and the high speed relay becomes deenergized, which results in the opening of back contact Mb and closing of the front contact Ma by heel contact M. Thus, a differentiating circuit is established from the positive voltage terminal +V, through primary winding P1, over heel and back contacts L-La, over heel and front contacts M-Ma, through secondary winding S2-2 and resistor R2 to the upper plate of charging capacitor C1. Accordingly, the voltage rapidly jumps from the zero value to one-third the value of the positive d.c. voltage +V. This positive transition is differentiated by capacitor C1 to cause a positive peaked pulse to be delivered to the holding input LH via resistor R4, winding S2-3 and capacitor C3. The positive peaked pulse is large enough to drive the Hold input momentarily to zero volts or beyond namely to a positive voltage value, so that the a.c. output signals are removed from the input of AND gate 11. The trainman or operator is alerted of the reception of the more restrictive speed command by a suitable warning device 17, such as, a ringing bell and flashing light, which is activated by an associated circuit (not shown). Thus, the operator has five (5) seconds to acknowledge before the time delay circuit 16 deenergizes the brake release relay to initiate the emergency braking action. Since the differentiated pulse only momentarily negates the negative Hold voltage —V, it is immediately returned but the latching circuit 10 does not begin producing a.c. output signals until a negative resetting voltage is applied to input LS. If the operator closes the acknowledging switch ACK within five (5) seconds, a negative set voltage is conveyed to input LS via capacitor C4 to latch the latching circuit so that a.c. voltage signals will again be fed to the one input of the AND gate 11. Now if the circuit is intact and functioning properly, the integrity of the differentiating circuit is checked over an a.c. circuit path extending from secondary winding S2-3, through resistor R4, over the upper plate of capacitor C1, through resistor R2 and secondary winding S2-2, over front and heel contacts Ma-M, over back and heel contacts Lb-L, through primary winding P1 to terminal +V. Thus, a sufficient amount of a.c. voltage is induced into secondary winding S1 which is amplified-rectified, level detected and amplified-rectified to provide a d.c. voltage to the other input of the AND gate. Accordingly, an input signal is again fed to the time delay circuit so that the brake release relay is prevented from dropping away and, therefore, the emergency braking application is precluded since the operator took the necessary action of depressing the acknowledging switch ACK within the prescribed period of time.

It will be seen that now if an even more restrictive speed, such as, a low or zero speed command, is received on board the train or transit vehicle, the operator must again acknowledge the receipt of the more restrictive speed command by closing switch ACK within the prescribed period of time. It will be observed that the picking up of the low speed relay establishes a charging circuit through contacts L-La which steps up the voltage to two-thirds the amplitude of the potential +V, and thus causes the differentiating capacitor C1 to produce a positive peaked voltage which momentarily negates the negative voltage —V on Hold input LH. The reception of a zero speed command signal causes the full voltage +V to be applied to the capacitor C1 which, in turn, results in a positive peaked pulse to be applied to the Hold input LH. Thus, the latching circuit 10 is unlatched or disabled by the momentary pulse and must be reset by closure of acknowledging switch ACK which causes a negative set pulse to be applied on input LS. Accordingly, the reception of any one of the more restrictive speed command signals requires acknowledgment by the operator within a given period of time in order to prevent the automatic application of the emergency brakes.

As previously mentioned, the presently described acknowledging circuit functions in a fail-safe manner in that no critical component or circuit failure is capable of causing an unsafe condition. For example, the opening and loss of a conductive lead or shorting of the charging capacitor C1 results in the removal of the negative holding voltage on the latching circuit 10 or in the disruption of the checking circuits which causes the elimination of the d.c. voltage to the other input of the AND gate 11. Further, any increase in the resistance or interruption in the checking circuits causes removal of the d.c. voltage to the other input of the AND gate 11. Any failure in the amplifier-rectifiers 13 and 15 destroys the amplifying or bias characteristic which is a safe condition. The opening or shorting of capacitor C2 is a safe failure. The four-terminal capacitor C3 is a vital element. The latching circuit 10, the AND gate 11, the time delay circuit 16 and the level detectors 12 and 14 are vital circuits.

While the subject invention has been described in relationship with an acknowledging circuit for cab signal systems for railroad and mass and/or rapid transit applications, it is readily apparent that the present invention may be employed in other systems, such as, industrial, governmental or commercial installations which have need of the vitality and unique operation.

It will be understood that the foregoing description of this invention is only illustrative, and it is not intended that the invention be limited to the exact embodiment shown and described, and that various changes, modifications and alterations within the purview of the appended claims may be made by those skilled in the art without departing from the spirit and scope of the invention.

Having now described the invention, what I claim as new and desire to secure by Letters Patent, is:

1. A fail-safe acknowledging circuit for requiring the acknowledgment of the receipt of a more restrictive signal comprising,
    (a) a plurality of signal command switches having a predetermined order of more restrictive significance,
    (b) a differentiating circuit selectively interconnectable by at least one of said plurality of signal command switches for establishing a selected one of a plurality of charging levels dependent upon the electrical condition of said plurality of signal command switches,
    (c) a latching circuit having a Hold input connectable to said differentiating circuit and having a set input connectable to an acknowledging means, said latching circuit having an output,
    (d) an AND circuit having one of two inputs connected to said output of said latching circuit,
    (e) a checking circuit connected to the other of said two inputs for verifying the absence of an unsafe condition, and said AND circuit producing an output signal when said latching circuit provides a signal to said one of said two inputs and said checking circuit provides a signal to said other of said two inputs.

2. The fail-safe acknowledging circuit as defined in claim 1, wherein each of said plurality of speed command switches takes the form of a speed command relay having a front and back contact.

3. The fail-safe acknowledging circuit as defined in claim 1, wherein an upward change in the level of the plurality of charging levels results in the unlatching of said latching circuit.

4. The fail-safe acknowledging circuit as defined in claim 1, wherein said checking circuit includes a level detecting circuit which monitors the voltage level of a d.c. supply source which is applied to said charging circuit.

5. The fail-safe acknowledging circuit as defined in claim 4, wherein a.c. signals are produced by said level detecting circuit when the voltage level of said d.c. supply source exceeds a predetermined amount.

6. The fail-safe acknowledging circuit as defined in claim 5, wherein said a.c. signals are transformer coupled to said charging circuit for causing a.c. current to flow through selected ones of said plurality of signal command switches.

7. The fail-safe acknowledging circuit as defined in claim 6, wherein said a.c. current is transformer coupled-amplified-rectified, level detected and amplified-rectified for supplying d.c. voltage to said other of said two inputs of said AND circuit.

8. The fail-safe acknowledging circuit as defined in claim 1, wherein said plurality of signal command switches is made up of low, medium and high speed command relays each having a front and back contact for changing the voltage level of said differentiating circuit in steps dependent upon whether the closure of the front or back contact of said low, medium and high speed command relays.

9. The fail-safe acknowledging circuit as defined in claim 8, wherein said front contact of said low speed command relay is coupled to said differentiating circuit via a resistor and a secondary winding of a voltage transformer.

10. The fail-safe acknowledging circuit as defined in claim 8, wherein said front contact of said medium speed corrugated relay is coupled to said differentiating circuit via a resistor and a secondary winding of a voltage transformer.

11. The fail-safe acknowledging circuit as defined in claim 8, wherein said back contact of said high speed command relay is directly coupled to said differentiating circuit.

12. The fail-safe acknowledging circuit as defined in claim 1, wherein said differentiating circuit produces a pulse which momentarily negates the Hold input when a more restrictive signal is received.

13. The fail-safe acknowledging circuit as defined in claim 1, wherein a time delay circuit is conditioned by said output signal of said AND circuit to energize a load and to deenergize said load a predetermined time after the disappearance of said output signal of said AND circuit.

* * * * *